(12) United States Patent
Mori

(10) Patent No.: US 10,730,804 B2
(45) Date of Patent: Aug. 4, 2020

(54) HONEYCOMB STRUCTURE

(71) Applicant: NGK INSULATORS, LTD., Nagoya (JP)

(72) Inventor: Kazuya Mori, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 294 days.

(21) Appl. No.: 15/909,015

(22) Filed: Mar. 1, 2018

(65) Prior Publication Data
US 2018/0257999 A1 Sep. 13, 2018

(30) Foreign Application Priority Data

Mar. 7, 2017 (JP) .................. 2017-042738

(51) Int. Cl.
| | |
|---|---|
| C04B 38/00 | (2006.01) |
| B01D 46/24 | (2006.01) |
| B01J 35/04 | (2006.01) |
| B01D 53/94 | (2006.01) |
| C04B 35/195 | (2006.01) |
| C04B 111/34 | (2006.01) |
| C04B 111/20 | (2006.01) |
| C04B 111/00 | (2006.01) |

(52) U.S. Cl.
CPC ...... *C04B 38/0009* (2013.01); *B01D 46/2455* (2013.01); *B01D 46/2462* (2013.01); *B01D 46/2474* (2013.01); *B01D 53/94* (2013.01); *B01J 35/04* (2013.01); *C04B 35/195* (2013.01); *C04B 38/0006* (2013.01); *B01D 2046/2481* (2013.01); *B01D 2046/2496* (2013.01); *B01D 2255/9155* (2013.01); *B01D 2279/30* (2013.01); *C04B 2111/0081* (2013.01); *C04B 2111/00793* (2013.01); *C04B 2111/2084* (2013.01); *C04B 2111/343* (2013.01); *C04B 2235/321* (2013.01); *C04B 2235/3217* (2013.01); *C04B 2235/3218* (2013.01); *C04B 2235/34* (2013.01); *C04B 2235/3418* (2013.01); *C04B 2235/3481* (2013.01)

(58) Field of Classification Search
None
See application file for complete search history.

(56) References Cited

U.S. PATENT DOCUMENTS 5,494,881 A 2/1996 Machida et al.

FOREIGN PATENT DOCUMENTS

| JP | H07-039761 A1 | 2/1995 |
|---|---|---|
| JP | 2013-056825 A1 | 3/2013 |

*Primary Examiner* — David Sample
*Assistant Examiner* — Elizabeth Collister
(74) *Attorney, Agent, or Firm* — Burr & Brown, PLLC

(57) ABSTRACT

A first circumferential wall disposed in a circumference of partition walls has no interface with the outermost circumference partition wall in a circumferential portion constituted by the partition walls whose wall thickness is larger than that of a central portion constituted by the partition walls in a central region. A maximum thickness of a total of the first circumferential wall and a second circumferential wall disposed to surround an outer side of the first circumferential wall is 1.2-3.0 mm, a difference between the maximum thickness and a minimum thickness of the total is 0.2-1.5 mm, and there is satisfied a relation, $0.5 \leq (TB-TA) \times SB/SA \times 100(\%) \leq 9.0$ in which TB and TA indicate average thicknesses ($\mu m$) of the partition walls in the circumferential and central portion respectively, and SB and SA indicate areas ($cm^2$) of the circumferential portion and the honeycomb structure in the cross section respectively.

10 Claims, 3 Drawing Sheets

HONEYCOMB STRUCTURE

The present application is an application based on JP 2017-042738 filed on Mar. 7, 2017 with Japan Patent Office, the entire contents of which are incorporated herein by reference.

BACKGROUND OF THE INVENTION

Field of the Invention

The present invention relates to a honeycomb structure, and more particularly, it relates to a honeycomb structure excellent in dimensional accuracy as well as isostatic strength.

Description of the Related Art

In various fields of chemistry, electricity, iron and steel, and the like, honeycomb structures made of ceramics have been employed as carriers for catalyst devices for use in environmental countermeasures, recovery of specific substances, and the like. Furthermore, the honeycomb structures made of ceramics have been used as exhaust gas purifying catalyst carriers and filters. The honeycomb structures made of ceramics are excellent in heat resistance and corrosion resistance, and are employed in various use applications as described above.

Such a honeycomb structure has a pillar shape and includes partition walls which define a plurality of cells to form through channels for an exhaust gas, and a circumferential wall which is disposed to surround a circumstance of the partition walls (e.g., see Patent Document 1). The honeycomb structure is manufactured by extruding a forming raw material including a ceramic raw material and the like to obtain a formed body in the form of honeycomb, and drying and firing the obtained formed body. In the honeycomb structure manufactured by such a method as described above, the partition walls and the circumferential wall are formed by extruding the material once, and hence, the partition walls and the circumferential wall form a continuous structure. Hereinafter, the honeycomb structure in which the partition walls and the circumferential wall are monolithically formed by the extrusion or the like will occasionally be referred to as "the monolithic honeycomb structure".

Furthermore, there has been suggested a technology of removing the circumferential wall of the honeycomb structure by machining such as grinding, and applying a circumference coating material including the ceramic raw material in place of the removed circumferential wall, to form a circumference coating layer (e.g., see Patent Document 2). In the honeycomb structure including the circumference coating layer, the circumferential wall is removed by the machining, and hence, the partition walls and the circumference coating layer form separate structures. Hereinafter, the honeycomb structure including the circumference coating layer will occasionally be referred to as "the circumference coating honeycomb structure".

[Patent Document 1] JP-A-H07-39761
[Patent Document 2] JP-A-2013-56825

SUMMARY OF THE INVENTION

A monolithic honeycomb structure has the advantage that, even when a thickness of a circumferential wall decreases, the honeycomb structure has an excellent thermal shock resistance, as compared with a circumference coating honeycomb structure. However, in the monolithic honeycomb structure, partition walls and the circumferential wall are monolithically formed by extrusion or the like, and hence, there is the problem that a dimensional accuracy of the obtained honeycomb structure easily deteriorates.

In particular, there is the tendency that the dimensional accuracy of a large honeycomb structure easily deteriorates. Consequently, in a circumferential portion of the large honeycomb structure, partition wall deformation such as cell deformation is likely to occur, thereby causing the problem that an isostatic strength deteriorates.

Furthermore, heretofore, there has been suggested a honeycomb structure constituted so that a thickness of partition walls in a circumferential portion of the honeycomb structure is larger than a thickness of partition walls in a central portion which is present inwardly from the circumferential portion. When a constitution including the above-mentioned circumference coating layer is to be applied to such a honeycomb structure, it is difficult to perform centering of the honeycomb structure in grinding a circumference, and there is also the problem that it is difficult to form the circumferential portion and the central portion into targeted shapes.

The present invention has been developed in view of the problems of such conventional technologies. The present invention is directed to a honeycomb structure excellent in dimensional accuracy as well as isostatic strength. In particular, the present invention is directed to a large honeycomb structure in which improvements of the dimensional accuracy and isostatic strength are achievable without increasing pressure loss or deteriorating thermal shock resistance.

According to the present invention, there is provided a honeycomb structure as follows.

[1] A honeycomb structure including:
a honeycomb structure body having porous partition walls which define a plurality of cells extending from an inflow end face to an outflow end face to form through channels for a fluid, and a first circumferential wall which is disposed in at least a part of a circumference of the partition walls, and
a second circumferential wall disposed to surround an outer side of the honeycomb structure body,
wherein the honeycomb structure body includes a central portion constituted by partition walls arranged in a central region of a cross section perpendicular to an extending direction of the cells, and a circumferential portion constituted so that a thickness of the partition walls of the circumferential portion is larger than a thickness of the partition walls of the central portion,
the honeycomb structure body does not have an interface between the partition wall of the outermost circumference in the circumferential portion and the first circumferential wall,
a maximum thickness X1 of a total of the first circumferential wall and the second circumferential wall is from 1.2 to 3.0 mm,
a difference Y between the maximum thickness X1 of the total of the first circumferential wall and the second circumferential wall and a minimum thickness X2 of the total of the first circumferential wall and the second circumferential wall is from 0.2 to 1.5 mm, and
the honeycomb structure body satisfies a relation of Equation (1) mentioned below:

$$0.5 \leq AB \leq 9.0, \quad \text{Equation (1):}$$

in which A indicates a value of a difference TB−TA (μm) between an average thickness TB (μm) of the partition walls in the circumferential portion and an average thickness TA (μm) of the partition walls in the central portion, and B indicates SB/SA×100(%) that is a percentage of a ratio of an area SB (cm²) of the circumferential portion in the cross section to an area SA (cm²) of the honeycomb structure in the cross section perpendicular to the extending direction of the cells.

[2] The honeycomb structure according to the above [1], wherein a diameter of the honeycomb structure in the cross section perpendicular to the extending direction of the cells is from 177.8 to 266.7 mm.

[3] The honeycomb structure according to the above [1] or [2], wherein in the cross section perpendicular to the extending direction of the cells, the minimum thickness X2 of the total of the first circumferential wall and the second circumferential wall is less than 1.4 mm.

[4] The honeycomb structure according to any one of the above [1] to [3], wherein in the cross section perpendicular to the extending direction of the cells, the difference A between the average thickness TB (μm) of the partition walls in the circumferential portion and the average thickness TA (μm) of the partition walls in the central portion is from 9 to 25 μm.

[5] The honeycomb structure according to any one of the above [1] to [4], wherein the percentage B of the ratio of the area SB (cm²) of the circumferential portion in the cross section to the area SA (cm²) of the honeycomb structure in the cross section perpendicular to the extending direction of the cells is from 10 to 30%.

[6] The honeycomb structure according to any one of the above [1] to [5], further including plugging portions disposed in open ends of the cells of at least parts of the plurality of cells on the side of the inflow end face or the outflow end face, to plug the open ends of the cells.

A honeycomb structure of the present invention exhibits the effect that the honeycomb structure is excellent in dimensional accuracy as well as isostatic strength. The honeycomb structure of the present invention further includes a second circumferential wall on an outer side of a honeycomb structure body constituted of partition walls and a first circumferential wall. The honeycomb structure body does not have an interface between the partition walls and the first circumferential wall. Therefore, the honeycomb structure body is a structure in which the partition walls are continuous with the first circumferential wall. The honeycomb structure of the present invention satisfies a relation of Equation (1) mentioned above, and hence, improvements of the dimensional accuracy and the isostatic strength are achievable. Particularly, according to the honeycomb structure of the present invention, the improvements of the dimensional accuracy and the isostatic strength can be achieved in a large honeycomb structure without increasing pressure loss or deteriorating a thermal shock resistance.

DESCRIPTION OF THE PREFERRED EMBODIMENTS

Figure 1:
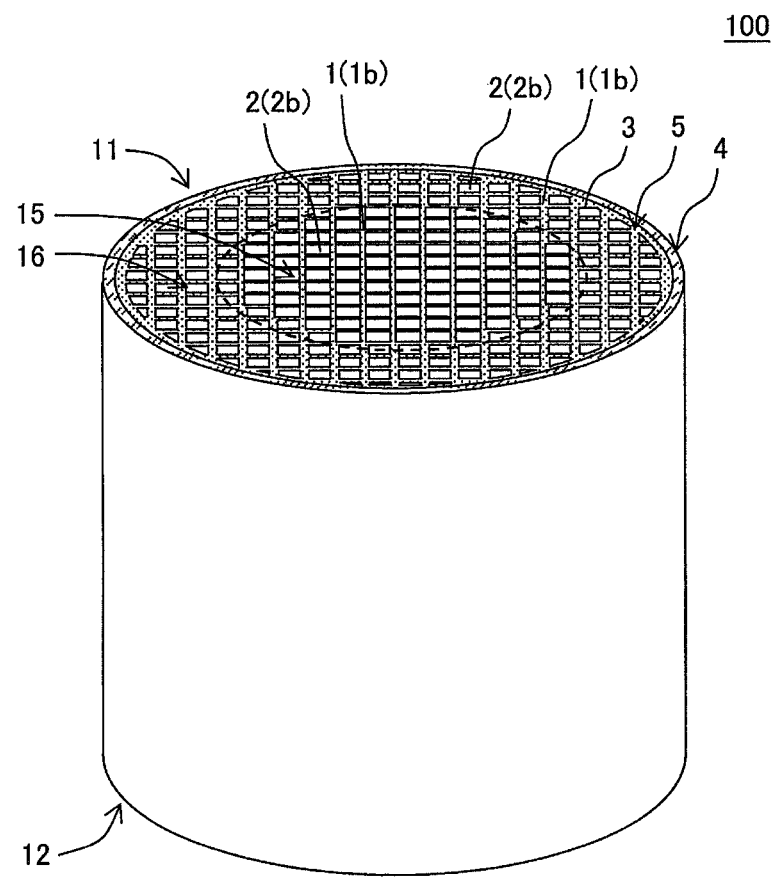
FIG. 1 is a perspective view schematically showing a first embodiment of a honeycomb structure of the present invention.

Hereinafter, description will be made as to embodiments of the present invention. However, the present invention is not limited to the following embodiments. Therefore, it should be understood that changes, improvements and the like are addable to the following embodiments on the basis of ordinary knowledge of a person skilled in the art without departing from the gist of the present invention.

(1) Honeycomb Structure (First Embodiment)

A first embodiment of a honeycomb structure of the present invention is such a honeycomb structure 100 as shown in FIG. 1 to FIG. 4. The honeycomb structure 100 further includes a second circumferential wall 4 on an outer side of a honeycomb structure body 5. The honeycomb structure body 5 has porous partition walls 1 and a first circumferential wall 3. The honeycomb structure body 5 does not have an interface between the partition walls 1 and the first circumferential wall 3. That is, it can be considered that the honeycomb structure body 5 is a structure in which the partition walls 1 are continuous with the first circumferential wall 3. The partition walls 1 of the honeycomb structure body 5 define a plurality of cells 2 extending from an inflow end face 11 to an outflow end face 12 to form through channels for a fluid. The first circumferential wall 3 is disposed to surround at least a part of a circumference of the partition walls 1. The second circumferential wall 4 is disposed to surround the outer side of the honeycomb structure body 5.

An example of the honeycomb structure body 5 is a structure in which the partition walls 1 and the first circumferential wall 3 are monolithically constituted. When "the partition walls 1 and the first circumferential wall 3 are monolithically constituted", it is meant that the partition walls 1 and the first circumferential wall 3 are formed by performing the formation once. Here, an example of the formation is extrusion. In the honeycomb structure 100 of the present embodiment, it can be considered that the honeycomb structure body 5 is a structure constituted of a sintered body in which the partition walls 1 are continuous with the first circumferential wall 3.

Figure 2:
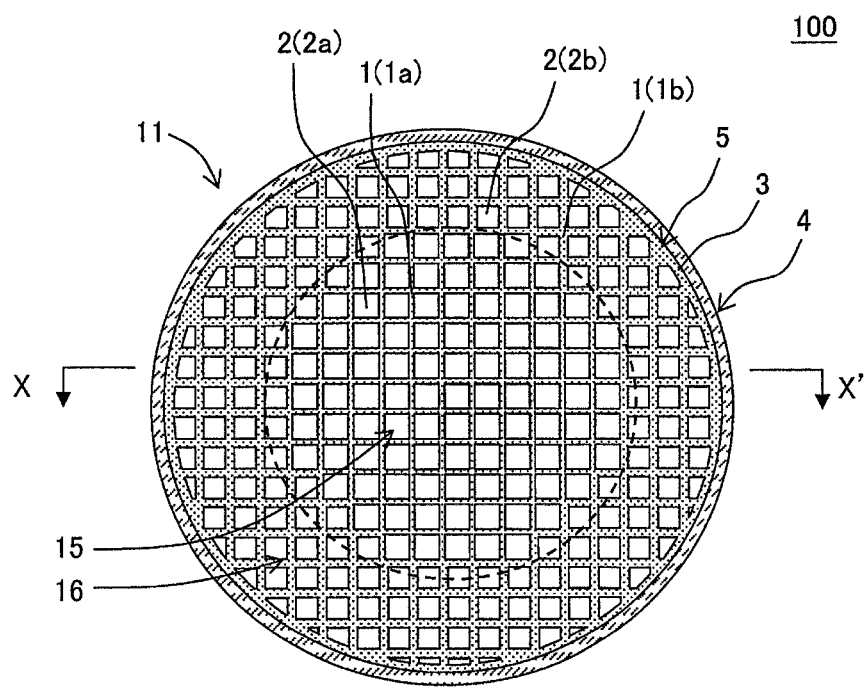
FIG. 2 is a plan view schematically showing an inflow end face of the honeycomb structure shown in FIG. 1.
Figure 3:
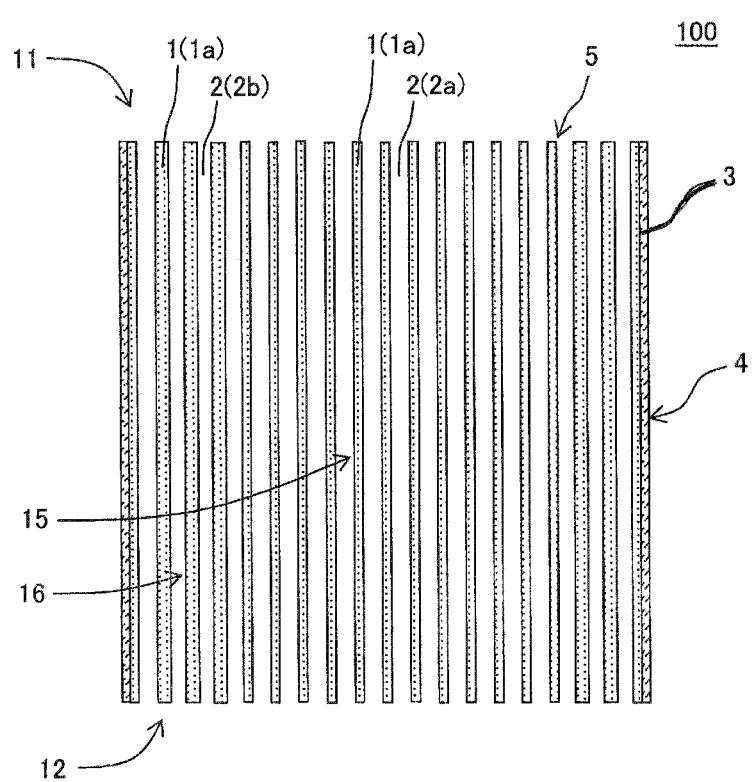
FIG. 3 is a cross-sectional view schematically showing a cross section taken along the X-X' line of FIG. 2.
Figure 4:
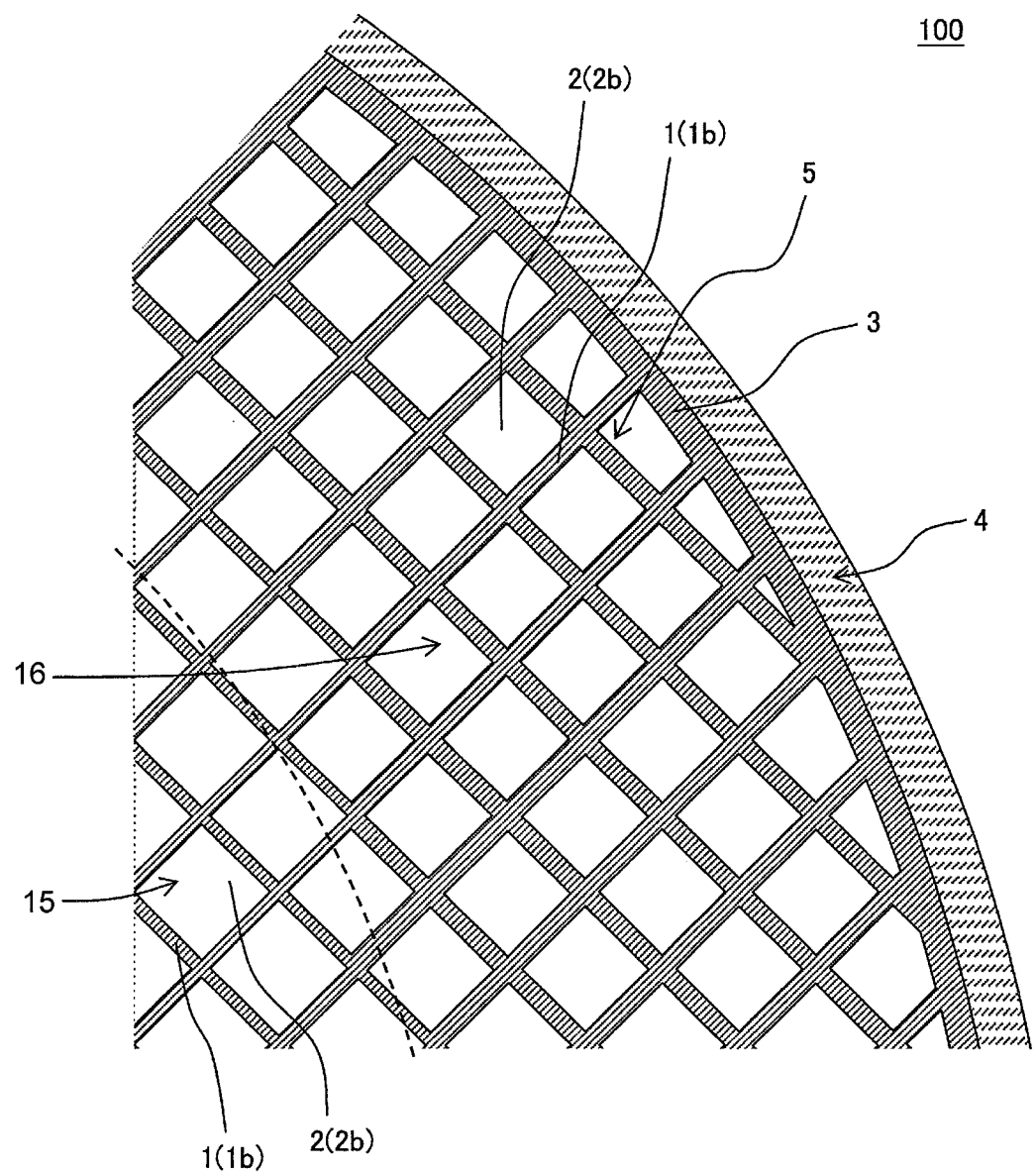
FIG. 4 is an enlarged plan view showing enlarged parts of a first circumferential wall and a second circumferential wall of the honeycomb structure shown in FIG. 2.

Here, FIG. 1 is a perspective view schematically showing the first embodiment of the honeycomb structure of the present invention. FIG. 2 is a plan view schematically showing the inflow end face of the honeycomb structure shown in FIG. 1. FIG. 3 is a cross-sectional view schematically showing a cross section taken along the X-X' line of FIG. 2. FIG. 4 is an enlarged plan view showing enlarged parts of the first circumferential wall and the second circumferential wall of the honeycomb structure shown in FIG. 2.

The honeycomb structure body 5 includes a central portion 15 constituted by partition walls 1a arranged in a central region of a cross section perpendicular to an extending direction of the cells 2, and a circumferential portion 16 constituted so that a thickness of partition walls 1b is larger than a thickness of the partition walls 1a of the central portion 15. Therefore, the honeycomb structure body 5 of the honeycomb structure 100 of the present embodiment has two regions having different thicknesses of the partition walls 1. These two regions are the central portion 15 positioned in the central region and the circumferential portion 16 disposed to surround this central region, in the cross section perpendicular to the extending direction of the cells 2. The central portion 15 of the honeycomb structure body 5 has a honeycomb structure in which a plurality of cells 2a are defined by the partition walls 1a having a relatively small thickness. Furthermore, the circumferential portion 16 of the honeycomb structure body 5 has a honeycomb structure in which a plurality of cells 2b are defined by the partition walls 1b having a relatively large thickness.

In the honeycomb structure 100 of the present embodiment, a maximum thickness X1 of a total of the first circumferential wall 3 and the second circumferential wall 4 is from 1.2 to 3.0 mm. When the maximum thickness X1 is less than 1.2 mm, dimensional accuracy of the honeycomb structure 100 deteriorates. That is, when a circumference of an extruded honeycomb formed body is coated with a circumference coating material to adjust a shape of the honeycomb formed body, it is difficult to sufficiently adjust the shape, and hence, the dimensional accuracy of the obtainable honeycomb structure 100 deteriorates. On the other hand, when the maximum thickness X1 is in excess of 3.0 mm, a thermal shock resistance of the honeycomb structure 100 deteriorates. The maximum thickness X1 is preferably from 1.4 to 2.6 mm and further preferably from 1.6 to 2.4 mm.

In the honeycomb structure 100 of the present embodiment, a difference Y between the maximum thickness X1 of the total of the first circumferential wall 3 and the second circumferential wall 4 and a minimum thickness X2 of the total of the first circumferential wall 3 and the second circumferential wall 4 (i.e., a value of "X1−X2") is from 0.2 to 1.5 mm. When the difference Y is less than 0.2 mm, the dimensional accuracy of the honeycomb structure 100 deteriorates. That is, when the difference Y is less than 0.2 mm and when the circumference of the extruded honeycomb formed body is coated with the circumference coating material to adjust the shape of the honeycomb formed body, it is difficult to sufficiently adjust the shape, and the dimensional accuracy of the obtainable honeycomb structure 100 deteriorates. On the other hand, when the difference Y is in excess of 1.5 mm, the thermal shock resistance of the honeycomb structure 100 deteriorates. The difference Y is preferably from 0.3 to 1.2 mm and further preferably from 0.4 to 1.0 mm.

Hereinafter, unless otherwise specified, "the thickness of the first circumferential wall" and "the thickness of the second circumferential wall" mean "the thickness of the first circumferential wall" and "the thickness of the second circumferential wall" in the cross section perpendicular to the extending direction of the cells. Furthermore, "the thickness of the partition walls" also means "the thickness of the partition walls" in the cross section perpendicular to the extending direction of the cells. Additionally, "the thickness of the total of the first circumferential wall and the second circumferential wall" means "the thickness of the total of the first circumferential wall and the second circumferential wall" which is measured in a state where the second circumferential wall is disposed on the surface of the first circumferential wall. That is, "the maximum thickness X1 of the total of the first circumferential wall and the second circumferential wall" is "a maximum value of a total thickness of the first circumferential wall and the second circumferential wall". Furthermore, "the minimum thickness X2 of the total of the first circumferential wall and the second circumferential wall" is "a minimum value of the total thickness of the first circumferential wall and the second circumferential wall".

In the honeycomb structure 100 of the present embodiment, the honeycomb structure body 5 satisfies a relation of Equation (1) mentioned below. It is to be noted that in Equation (1), "AB" indicates a product of "a value of A" and "a value of B".

$$0.5 \leq AB \leq 9.0 \qquad \text{Equation (1):}$$

Here, in Equation (1), A indicates a value of a difference between an average thickness TB (μm) of the partition walls 1b in the circumferential portion 16 of the honeycomb structure body 5 and an average thickness TA (μm) of the partition walls 1a in the central portion 15 of the honeycomb structure body 5. That is, A satisfies a relation of Equation (a): A=TB−TA, and its unit is (μm). Hereinafter, this A will occasionally be referred to as "the difference A".

Furthermore, in Equation (1), B indicates is a percentage of a ratio of an area SB ($cm^2$) of the circumferential portion 16 in the cross section to an area SA ($cm^2$) of the honeycomb structure 100 in the cross section perpendicular to the extending direction of the cells 2. That is, B satisfies a relation of Equation (b): B=SB/SA×100(%) and its unit is (%). Hereinafter, unless otherwise specified, "the area SA of the honeycomb structure 100" means "the area SA of the honeycomb structure 100 in the cross section perpendicular to the extending direction of the cells 2". Furthermore, "the area SB of the circumferential portion 16" means "the area SB of the circumferential portion 16 of the honeycomb structure 100 in the cross section perpendicular to the extending direction of the cells 2". Hereinafter, the above-mentioned "B" will occasionally be referred to as "the percentage B". Additionally, this "percentage B" is a value indicating the ratio of the area of the circumferential portion 16 to the area of the honeycomb structure 100, and hence, this "percentage B" will occasionally be referred to as "the area ratio B".

When a value of AB in Equation (1) is less than 0.5, the dimensional accuracy and an isostatic strength deteriorate. Furthermore, when the value of AB in Equation (1) is in excess of 9.0, pressure loss of the honeycomb structure 100 increases. The value of AB is preferably from 1.0 to 7.0 and further preferably from 2.0 to 5.0.

The maximum thickness X1 of the total of the first circumferential wall 3 and the second circumferential wall 4 is a maximum value among measured thicknesses of 24 points which are obtained by measuring the thickness of the total (hereinafter referred to as "the total thickness") of eight points of each of three cross sections mentioned below in the honeycomb structure 100 of a measurement object. The cross sections in which the total thicknesses are measured are three cross sections including a cross section of the honeycomb structure 100 on the side of the inflow end face 11, a cross section of the honeycomb structure 100 on the side of the outflow end face 12, and a central cross section of the honeycomb structure 100 in the extending direction of the cells 2. The cross section of the honeycomb structure 100 on the side of the inflow end face 11 is an optional cross section within 5% of a length from the inflow end face 11 of the honeycomb structure 100 in the extending direction of the cells 2. The cross section of the honeycomb structure 100 on the side of the outflow end face 12 is an optional cross section within 5% of a length from the outflow end face 12 of the honeycomb structure 100 in the extending direction of the cells 2. The central cross section of the honeycomb structure 100 in the extending direction of the cells 2 is an optional cross section within ±5% of a length from the center of the honeycomb structure 100 in the extending direction of the cells 2. As to measurement points in each cross section, one measurement point is initially determined in each cross section. Then, there are determined seven measurement points moved in a clockwise direction every 45° from the above measurement point. Eight measurement points obtained by adding the initially determined measurement point to the seven measurement points moved every 45° are determined as the measurement points in each cross section.

Then, each measurement point is observed with a scanning electron microscope or a microscope to measure the total thickness of the first circumferential wall 3 and the second circumferential wall 4, after the measurement points are determined as described above. The total thickness of the first circumferential wall 3 and the second circumferential wall 4 is a thickness in a normal direction to the surface of the second circumferential wall 4. Furthermore, when the above total thickness is measured, intersecting portions of the first circumferential wall 3 and the partition walls 1 are observed, and presence/absence of a boundary between the first circumferential wall 3 and the partition walls 1 can be confirmed. When there is not the boundary between the first circumferential wall 3 and the partition walls 1, it can be judged that there is not the interface between the first circumferential wall 3 and the partition walls 1. For example, when the first circumferential wall 3 and the partition walls 1 form a structure constituted of the sintered body, it can be considered that the first circumferential wall 3 is constituted monolithically with the partition walls 1. It is to be noted that the presence/absence of the boundary can be confirmed in accordance with a difference in color tone between the first circumferential wall 3 and the partition walls 1 in the above-mentioned image. For example, when a composition of the first circumferential wall 3 is different from that of the partition walls 1, the color tone of the first circumferential wall 3 is different from that of the partition walls 1. Furthermore, except for the above-mentioned color tone, the presence/absence of the boundary can be judged, for example, in accordance with particle diameters of particles constituting the first circumferential wall 3 and the partition walls 1, respectively, or a difference in density, e.g., a difference in porosity or the like.

A boundary between the first circumferential wall 3 and the second circumferential wall 4 can be confirmed in an enlarged image with the scanning electron microscope or the microscope. For example, in the above-mentioned image, the boundary can be judged in accordance with a difference in color tone between the first circumferential wall 3 and the second circumferential wall 4. Furthermore, except for the above-mentioned color tone, the boundary can be judged, for example, in accordance with particle diameters of particles constituting the first circumferential wall 3 and the second circumferential wall 4, respectively, or a difference in density, e.g., a difference in porosity or the like.

Furthermore, the minimum thickness X2 of the total of the first circumferential wall 3 and the second circumferential wall 4 is obtainable as a minimum value among the above-mentioned total thicknesses of 24 points which are measured to obtain the maximum thickness X1 mentioned above.

The average thickness TB (μm) of the partition walls 1b in the circumferential portion 16 and the average thickness TA (μm) of the partition walls 1a in the central portion 15 are obtainable by the following method. Initially, the cross section of the honeycomb structure 100 is imaged. Next, as to the image obtained by the imaging, thicknesses of the respective partition walls 1a and 1b are measured, and the average thicknesses are calculated, respectively. Measurement regions (measurement points) in which the thicknesses of the partition walls 1a and 1b are measured are determined as follows.

The measurement regions (the measurement points) in which the average thickness TB (μm) of the partition walls 1b in the circumferential portion 16 is obtained are twelve points as follows. Initially, from the outermost circumference of the honeycomb structure 100, one partition wall 1b in a first cell excluding incomplete cells 2 is determined as a first measurement point. Next, a virtual line is drawn from this first measurement point toward a radial direction, and on the virtual line, the partition wall 1b of the circumferential portion 16 which is present at a position closest to a boundary between the circumferential portion 16 and the central portion 15 is determined as a second measurement point. Then, on the virtual line linearly connecting the first measurement point to the second measurement point, the partition wall 1b present at a position closest to a midpoint is determined as a third measurement point. Next, the partition wall 1b which is present at a position closest to a point moved in the clockwise direction as much as 90° from the first measurement point is determined as a fourth measurement point. Next, in the same manner as in the first measurement point, a virtual line is drawn from the fourth measurement point toward the radial direction, and on the virtual line, the partition wall 1b of the circumferential portion 16 which is present at a position closest to the boundary between the circumferential portion 16 and the central portion 15 is determined as a fifth measurement point. Then, on the virtual line linearly connecting the fourth measurement point to the fifth measurement point, the partition wall 1b which is present at a position closest to a midpoint is determined as a sixth measurement point. Hereinafter, as to each of a point moved in the clockwise direction as much as 90° from the fourth measurement point (in the clockwise direction as much as 180° from the first measurement point) and a point moved in the clockwise direction as much as 90° further from this point (in the clockwise direction as much as 270° from the first measurement point), three measurement points are determined. In this way, twelve measurement points in total are determined. An average value of the thicknesses of the partition walls 1b which are measured at the twelve points determined in this way is "the average thickness TB (μm) of the partition walls 1b in the circumferential portion 16". It is to be noted that in the cross section of the honeycomb structure 100, the circumferential portion 16 is a region where the thickness of the partition walls 1b is 2.5 μm or more larger than the thickness of the partition walls 1a in the central portion 15 and the partition walls 1b having such a thickness is continuous with the partition wall 1b of the outermost circumference.

Measurement regions (measurement points) in obtaining the average thickness TA (μm) of the partition walls 1a in the central portion 15 are twelve points as follows. It is to be noted that positions of the measurement points in obtaining the average thickness TA (μm) are determined on the basis of "the partition wall 1b of the circumferential portion 16 which is present at the position closest to the boundary" among the above-mentioned measurement points in the average thickness TB (μm). In an example of the second measurement point in the average thickness TB (μm), on an extension line of the virtual line in determining the second measurement point, the partition wall 1a on the side of the central portion 15 which is present at a position closest to the boundary between the circumferential portion 16 and the central portion 15 is determined as the measurement point in the average thickness TA (μm). In this way, there are determined four measurement points in the average thickness TA (μm) which correspond to four measurement points in the average thickness TB (μm). Then, between two measurement points which are present in the same radial direction among the four measurement points, four measurement points are determined at equal intervals. It is to be noted that "the two measurement points which are present in the same radial direction" are two measurement points corresponding to the above-mentioned measurement points in the average thickness TB (μm) and moved in the clockwise direction as much as 180°. In this way, six measurement points are provided at the equal intervals in the same radial direction of each of two axes, to determine twelve measurement points in total. An average value of the thicknesses of the partition walls $1a$ measured at the twelve measurement points determined in this way is "the average thickness TA (μm) of the partition walls $1a$ in the central portion 15".

The area SA ($cm^2$) of the honeycomb structure 100 in the cross section perpendicular to the extending direction of the cells 2 is a sectional area calculated from an average diameter of four points of the round pillar-shaped honeycomb structure 100. In the measurement of the average diameter of the four points, initially, diameters of four points in total are measured with a pair of Vernier calipers at intervals of 45° from one point of the circumference of the honeycomb structure 100 in the cross section of the honeycomb structure 100 which is perpendicular to the extending direction of the cells 2. Next, an average value of the measured diameters of the four points is obtained, and the obtained average value is an average diameter (mm) of the four points of the honeycomb structure 100. The area SB ($cm^2$) of the circumferential portion 16 of the honeycomb structure 100 in the cross section perpendicular to the extending direction of the cells 2 is obtainable by multiplying the area SA of the honeycomb structure 100 by the percentage B of the ratio of the sectional area of the circumferential portion 16.

There are not any special restrictions on a shape of the cells 2 in the cross section perpendicular to the extending direction of the cells 2. Examples of the shape of the cells 2 include a triangular shape, a quadrangular shape, a hexagonal shape, an octagonal shape, a round shape, and any combination of these shapes.

The minimum thickness X2 of the total of the first circumferential wall 3 and the second circumferential wall 4 is preferably less than 1.4 mm and further preferably less than 1.2 mm. When the minimum thickness X2 is 1.4 mm or more, there is the possibility that the thermal shock resistance of the honeycomb structure 100 which is required to resist under actual use environment is not acquirable.

The average thickness TA of the partition walls $1a$ in the central portion 15 is preferably from 50 to 260 μm and further preferably from 60 to 210 μm. When the average thickness TA is less than 50 μm, it is hard to acquire the isostatic strength which is necessary in holding the honeycomb structure 100. Furthermore, when the average thickness TA is larger than 260 μm, the pressure loss might increase.

The average thickness TB of the partition walls $1b$ in the circumferential portion 16 is preferably from 60 to 280 μm and further preferably from 70 to 230 μm. When the average thickness TB is less than 60 μm, it is hard to acquire the isostatic strength which is necessary in holding the honeycomb structure 100. Furthermore, when the average thickness TB is larger than 280 μm, the pressure loss might increase.

The percentage B of the ratio of the area SB ($cm^2$) of the circumferential portion 16 in the cross section to the area SA ($cm^2$) of the honeycomb structure 100 in the cross section perpendicular to the extending direction of the cells 2 is preferably from 10 to 30% and further preferably from 15 to 25%. When the above "percentage B" is less than 10%, it is hard to acquire the isostatic strength which is necessary in holding the honeycomb structure 100 or the shape of the extruded honeycomb formed body might deteriorate. Furthermore, when the above "percentage B" is in excess of 30%, the pressure loss might increase.

In the cross section perpendicular to the extending direction of the cells 2, the difference A between the average thickness TB (μm) of the partition walls $1b$ in the circumferential portion 16 and the average thickness TA (μm) of the partition walls $1a$ in the central portion 15 is preferably from 9 to 25 μm and further preferably from 12 to 20 μm. When the difference A between the average thickness TB (μm) and the average thickness TA (μm) is less than 9 μm, it is hard to acquire the isostatic strength which is necessary in holding the honeycomb structure 100 or the shape of the extruded honeycomb formed body might deteriorate. Furthermore, when the difference A between the average thickness TB (μm) and the average thickness TA (μm) is larger than 25 μm, the pressure loss might increase.

A porosity of the partition walls $1a$ and the partition walls $1b$ is preferably from 25 to 60%. When the porosity of the partition walls $1a$ and the partition walls $1b$ is less than 25%, the pressure loss of the honeycomb structure 100 might increase. For example, when the honeycomb structure is used as a PM trapping filter to be disposed in an exhaust system of an engine, output drop of the engine might be caused. Furthermore, when the porosity of the partition walls is in excess of 60%, a sufficient strength might not be obtained. The porosity of the partition walls $1a$ and partition walls $1b$ is a value measured with a mercury porosimeter. An example of the mercury porosimeter is AutoPore 9500 (tradename) manufactured by Micromeritics Instrument Corp.

A cell density of the honeycomb structure 100 is, for example, preferably from 28 to 140 cells/$cm^2$. When the cell density is less than 28 cells/$cm^2$ and when the honeycomb structure 100 is used as an exhaust gas purifying member, an area to perform an exhaust gas purifying treatment decreases, and a sufficient purification performance might not be exerted. On the other hand, when the cell density is in excess of 140 cells/$cm^2$, the pressure loss in passing a gas through the honeycomb structure 100 might increase.

An example of an overall shape of the honeycomb structure 100 is a pillar shape in which an end face has a round shape, an oval shape or the like. As to a size of the honeycomb structure 100 having the round pillar shape, for example, a diameter of the honeycomb structure 100 in the cross section perpendicular to the extending direction of the cells 2 is preferably from 177.8 to 266.7 mm. Furthermore, a length of the honeycomb structure 100 in a central axis direction is preferably from 50 to 260 mm.

There are not any special restrictions on a material of the partition walls 1 and the first circumferential wall 3. An example of the material of the partition walls 1 and the first circumferential wall 3 is a material containing ceramic as a main component. A suitable example of ceramic is a material containing at least one selected from the group consisting of cordierite, silicon carbide, a silicon-silicon carbide based composite material, mullite, alumina, aluminum titanate, silicon nitride, a cordierite forming raw material, lithium aluminum silicate, and a silicon carbide-cordierite based composite material. When the material "contains ceramic as the main component", it is meant that ceramic is contained as much as 50 mass % or more in the whole material.

There are not any special restrictions on a material of the second circumferential wall 4. An example of the material of the second circumferential wall 4 is a material containing ceramic as a main component. An example of the material of the second circumferential wall is similar to the suitable example of the material of the partition walls 1 and the first circumferential wall 3. It is more preferable that the second circumferential wall 4 is a circumference coating layer formed by coating the surface of the first circumferential wall 3 with a circumference coating material including such a material as described above.

In the honeycomb structure 100 of the present embodiment, a catalyst may be loaded onto the partition walls 1 forming the plurality of cells 2. The loading of the catalyst onto the partition walls 1 indicates that the catalyst is coated on the surfaces of the partition walls 1 and inner walls of pores formed in the partition walls 1. Examples of a type of catalyst include an SCR catalyst (zeolite, titania and vanadium), and a three-way catalyst including at least two of noble metals Pt, Rh and Pd, and at least one of alumina, ceria and zirconia. The loading of such a catalyst enables detoxification of $NO_x$, CO, HC and the like included in an exhaust gas emitted from a direct injection type gasoline engine, a diesel engine and the like.

In the honeycomb structure of the present embodiment, there are not any special restrictions on a method of loading such a catalyst as described above, and a method usually performed by the person skilled in the art is employable. Specifically, an example of the method is a method of wash-coating a catalyst slurry, followed by drying and firing.

The honeycomb structure of the present embodiment may further include plugging portions disposed in open ends of the cells of at least parts of the plurality of cells on the side of the inflow end face or the outflow end face, to plug the open ends of the cells. For example, the plugging portions to plug the open ends of the cells may be disposed in the open ends of the predetermined cells on the side of the inflow end face and the open ends of the residual cells other than the predetermined cells on the side of the outflow end face. Also in the honeycomb structure further including the plugging portions, an effect similar to the above-mentioned effect of the honeycomb structure can be expected. It is to be noted that in the honeycomb structure further including the plugging portions, the plugging portions to plug the open ends on one of the sides may be disposed in all the cells, or the plugging portions to plug the open ends on the one side may be disposed in parts of the cells.

(2) Manufacturing Method of Honeycomb Structure

Next, description will be made as to a method of manufacturing the honeycomb structure of the present invention.

Initially, a kneaded material having plasticity to prepare the partition walls and the first circumferential wall is prepared. The kneaded material to prepare the partition walls and the first circumferential wall can be prepared by suitably adding an additive such as a binder and water to a material selected as raw material powder from the above-mentioned suitable material group of the partition walls. Examples of the above-mentioned additive include an organic binder, a dispersing agent, and a surfactant.

Next, the prepared kneaded material is extruded to obtain a pillar-shaped honeycomb formed body having partition walls which define a plurality of cells and a first circumferential wall which is disposed to surround the partition walls.

In the extrusion, an extruding die is usable in which slits having an inverted shape of the honeycomb formed body to be formed are formed in a kneaded material extruding surface.

The obtained honeycomb formed body may be dried, for example, with microwaves and hot air. Furthermore, open ends of the cells may be plugged with a material similar to the material used in the preparation of the honeycomb formed body, to dispose plugging portions.

Next, the obtained honeycomb formed body is fired, thereby obtaining the honeycomb structure body including the partition walls and the first circumferential wall. The honeycomb structure body is the honeycomb structure before the second circumferential wall is disposed. Firing temperature and firing atmosphere vary in accordance with the material used in the preparation of the honeycomb formed body, and the person skilled in the art can select the firing temperature and firing atmosphere which are most suitable for the selected material. Here, as to the first circumferential wall of the obtained honeycomb structure body, the surface of the first circumferential wall may suitably be ground by known machining or the like, to adjust its thickness to a desirable thickness.

Next, the circumference coating material to form the second circumferential wall is prepared. The circumference coating material can be prepared by suitably adding an additive such as the binder, and water to a material selected as the raw material powder from the above-mentioned suitable material group of the second circumferential wall.

Next, the obtained circumference coating material is coated on the surface of the honeycomb structure body. The coated circumference coating material is dried, and the second circumferential wall is formed on the surface of the first circumferential wall of the honeycomb structure body. When necessary, the honeycomb structure body coated with the circumference coating material may be fired after the circumference coating material is dried. As described above, the honeycomb structure of the present invention can be manufactured. The method of manufacturing the honeycomb structure of the present invention is not limited to the hitherto described method.

EXAMPLES

Example 1

To 100 parts by mass of cordierite forming raw material, 35 parts by mass of dispersing medium, 6 parts by mass of organic binder and 0.5 parts by mass of dispersing agent were added, mixed and kneaded to prepare a kneaded material for extrusion. As the cordierite forming raw material, alumina, aluminum hydroxide, kaolin, talc and silica were used. Water was used as the dispersing medium, cokes having an average particle diameter of 1 to 10 μm were used as a pore former, hydroxypropyl methylcellulose was used as the organic binder, and ethylene glycol was used as the dispersing agent.

Next, the kneaded material was extruded by using a honeycomb formed body preparing die, and a honeycomb formed body whose overall shape was a round pillar shape was obtained. Additionally, there was used the honeycomb formed body preparing die constituted so that a width of slits on the side of a kneaded material discharge surface varied in a central portion and a circumferential portion of the obtained honeycomb formed body. Consequently, the obtained honeycomb formed body was formed so that a thickness of partition walls of the central portion is different from that of partition walls of the circumferential portion.

Then, the obtained honeycomb formed body was dried with a microwave drier, and further completely dried with a hot air drier. Afterward, both end faces of the honeycomb formed body were cut to adjust a dimension of the honeycomb formed body to a predetermined dimension.

Next, the dried honeycomb formed body was degreased and fired, thereby obtaining a honeycomb structure body including partition walls and a first circumferential wall. The obtained honeycomb structure body had a round pillar shape in which a diameter of each end face was 177.8 mm, and a length in a cell extending direction was 152.4 mm. In the obtained honeycomb structure body, a thickness of the partition walls in a central portion was different from a thickness of the partition walls in a circumferential portion. An average thickness TA of the partition walls in the central portion was 114 µm. An average thickness TB of the partition walls in the circumferential portion was 127 µm. A difference A between the average thickness TB of the partition walls in the circumferential portion and the average thickness TA of the partition walls in the central portion was 13 µm. Additionally, this difference A is "TB–TA". Table 1 shows a value of the difference between the average thickness TB of the partition walls in the circumferential portion and the average thickness TA of the partition walls in the central portion, i.e., a value of "TB–TA" in a column of "the difference A (µm) between the average thickness TB and the average thickness TA".

The average thickness TA of the partition walls in the central portion and the average thickness TB of the partition walls in the circumferential portion were measured by the following method. Initially, a cross section of a honeycomb structure was imaged. Next, thicknesses of respective partition walls in an image obtained by the imaging were measured, and the average thicknesses were calculated. Each of the average thickness TA of the partition walls in the central portion and the average thickness TB of the partition walls in the circumferential portion was an average value of the thicknesses of the partition walls of twelve points as follows. As to measurement points in obtaining the average thickness TB, from the outermost circumference of the honeycomb structure, one partition wall in a first cell excluding incomplete cells was determined as a first measurement point, and from this first measurement point toward a radial direction, the partition wall at a position closest to a boundary between the circumferential portion and the central portion was determined as a second measurement point. Then, the partition wall at a position of a midpoint between the first measurement point and the second measurement point was determined as a third measurement point. Then, three measurement points in a clockwise direction every 90° from the first measurement point (nine measurement points in total) were determined. Twelve measurement points in total including the initially determined three measurement points, i.e., the first to third measurement points, and the nine measurement points in total determined at 90° intervals were determined as the measurement points in obtaining the average thickness TB. Additionally, the twelve measurement points in obtaining the average thickness TB are measurement points which are present on two axes in the radial direction. As to measurement points in obtaining the average thickness TA, six measurement points were determined on each of two axes which were the same as the axes during the measurement of the partition wall thicknesses in the circumferential portion. Specifically, as to each axis, the partition wall at the position closest to the boundary between the circumferential portion and the central portion was necessarily included as the measurement point, and the six measurement points on each axis were determined so that the points were disposed at equal intervals on each axis.

A cell density of the honeycomb structure body was 62 cells/cm$^2$. A porosity of the partition walls was 35%. The porosity of the partition walls was measured with AutoPore 9500 (tradename) manufactured by Micromeritics Instrument Corp. Table 1 shows a value of the average thickness TA of the partition walls in the central portion in a column of "the average thickness TA (µm) of the partition walls". Table 1 shows a value of the porosity of the partition walls in the central portion and the circumferential portion in a column of "the porosity (%) of the partition walls". Table 1 shows a value of the cell density of the honeycomb structure body in a column of "the cell density (cells/cm$^2$)".

Next, a circumference coating material was coated on the surface of the first circumferential wall of the honeycomb structure body, and the coated circumference coating material was dried to prepare a second circumferential wall. The circumference coating material was prepared by mixing cordierite particles, colloidal silica, water and a dispersing agent.

As described above, there was manufactured the honeycomb structure of Example 1 including the honeycomb structure body having the partition walls and the first circumferential wall, and the second circumferential wall disposed to surround an outer side of the first circumferential wall of the honeycomb structure body.

In the honeycomb structure of Example 1, a maximum thickness X1 of a total of the first circumferential wall and the second circumferential wall was 2.0 mm. A difference Y between the maximum thickness X1 of the total of the first circumferential wall and the second circumferential wall and a minimum thickness X2 of the total of the first circumferential wall and the second circumferential wall was 0.8 mm. It is to be noted that this difference Y is represented by "X1–X2". Table 1 shows a value of "the maximum thickness X1 of the total of the first circumferential wall and the second circumferential wall" in a column of "the maximum thickness X1 (mm) of the circumferential wall". Table 1 shows a value of "the difference Y between the maximum thickness X1 of the total of the first circumferential wall and the second circumferential wall and the minimum thickness X2 of the total of the first circumferential wall and the second circumferential wall" in a column of "the difference Y (mm) between the maximum thickness X1 and the minimum thickness X2".

A total thickness of the first circumferential wall and the second circumferential wall was measured at eight points of each of three cross sections mentioned below in the honeycomb structure of a measurement object, and the maximum thickness X1 and the minimum thickness X2 of the total of the first circumferential wall and the second circumferential wall were obtained from a maximum value and a minimum value among the measured thicknesses of 24 points. The cross sections in which the respective thicknesses were measured were three cross sections including a cross section of the honeycomb structure on the side of an inflow end face, a cross section of the honeycomb structure on the side of an outflow end face, and a central cross section of the honeycomb structure in a cell extending direction. The cross section of the honeycomb structure on the side of the inflow end face was an optional cross section within 5% of the length in the cell extending direction from the inflow end face of the honeycomb structure. The cross section of the honeycomb structure on the side of the outflow end face was an optional cross section within 5% of the length in the cell extending direction from the outflow end face of the honeycomb structure. The central cross section of the honeycomb structure in the cell extending direction was an optional cross section within ±5% of the length in the cell extending direction from the center of the honeycomb structure.

Furthermore, in the honeycomb structure of Example 1, a percentage of a ratio of an area SB ($cm^2$) of the circumferential portion in the cross section to an area SA ($cm^2$) of the honeycomb structure in the cross section perpendicular to the cell extending direction was 20%. It is to be noted that this percentage is represented by "SB/SA×100(%)". Table 1 shows a value of the percentage of the ratio of the area SB ($cm^2$) of the circumferential portion in the cross section to the area SA ($cm^2$) of the honeycomb structure in the cross section perpendicular to the cell extending direction in a column of "the area ratio B (%) of the circumferential portion". Furthermore, Table 1 shows a value obtained by multiplying the above-mentioned "difference A" by "the area ratio B" in a column of "AB".

TABLE 2-continued

|  | Isostatic strength | Dimensional accuracy | Pressure loss | Thermal shock resistance |
|---|---|---|---|---|
| Example 6 | C | C | B | C |
| Example 7 | C | C | B | C |
| Comparative Example 4 | C | B | B | D |
| Comparative Example 5 | C | B | B | D |
| Example 8 | A | A | C | A |
| Example 9 | A | A | C | A |
| Example 10 | A | C | C | A |
| Comparative Example 6 | A | D | C | A |
| Comparative Example 7 | A | D | C | A |
| Comparative Example 8 | A | A | D | A |
| Comparative Example 9 | A | A | D | A |

TABLE 1

|  | Porosity of partition walls [%] | Maximum thickness X1 of circumferential wall [mm] | Difference Y between maximum thickness X1 and minimum thickness X2 [mm] | Average thickness TA of partition walls [μm] | Difference A between average thickness TB and average thickness TA [μm] | Area ratio of circumferential portion B [%] | AB | Cell density [cells/$cm^2$] |
|---|---|---|---|---|---|---|---|---|
| Comparative Example 1 | 35 | 1.0 | 0.1 | 114 | 0 | 0% | 0.0 | 62 |
| Example 1 | 35 | 2.0 | 0.8 | 114 | 13 | 20% | 2.5 | 62 |
| Example 2 | 35 | 2.5 | 1.2 | 114 | 9 | 20% | 1.8 | 62 |
| Example 3 | 35 | 2.0 | 0.8 | 114 | 25 | 20% | 5.0 | 62 |
| Example 4 | 35 | 2.5 | 1.2 | 114 | 13 | 10% | 1.3 | 62 |
| Example 5 | 35 | 2.0 | 0.8 | 114 | 13 | 30% | 3.9 | 62 |
| Comparative Example 2 | 35 | 3.0 | 1.5 | 114 | 6 | 7% | 0.4 | 62 |
| Comparative Example 3 | 35 | 3.0 | 1.5 | 114 | 3 | 14% | 0.4 | 62 |
| Example 6 | 35 | 3.0 | 1.5 | 114 | 6 | 8% | 0.5 | 62 |
| Example 7 | 35 | 3.0 | 1.5 | 114 | 8 | 6% | 0.5 | 62 |
| Comparative Example 4 | 35 | 3.1 | 1.5 | 114 | 8 | 6% | 0.5 | 62 |
| Comparative Example 5 | 35 | 3.0 | 1.6 | 114 | 8 | 6% | 0.5 | 62 |
| Example 8 | 35 | 1.7 | 0.6 | 114 | 26 | 35% | 9.0 | 62 |
| Example 9 | 35 | 1.7 | 0.6 | 114 | 28 | 32% | 9.0 | 62 |
| Example 10 | 35 | 1.2 | 0.2 | 114 | 26 | 35% | 9.0 | 62 |
| Comparative Example 6 | 35 | 1.1 | 0.2 | 114 | 26 | 35% | 9.0 | 62 |
| Comparative Example 7 | 35 | 1.2 | 0.1 | 114 | 26 | 35% | 9.0 | 62 |
| Comparative Example 8 | 35 | 1.7 | 0.6 | 114 | 26 | 36% | 9.2 | 62 |
| Comparative Example 9 | 35 | 1.7 | 0.6 | 114 | 28 | 33% | 9.2 | 62 |

TABLE 2

|  | Isostatic strength | Dimensional accuracy | Pressure loss | Thermal shock resistance |
|---|---|---|---|---|
| Comparative Example 1 | Standard | A | Standard | A |
| Example 1 | B | A | A | A |
| Example 2 | B | B | A | B |
| Example 3 | B | A | B | A |
| Example 4 | B | B | A | A |
| Example 5 | B | B | B | B |
| Comparative Example 2 | D | D | C | C |
| Comparative Example 3 | D | D | C | C |

As to the honeycomb structure of Example 1, "isostatic strength", "dimensional accuracy", "pressure loss" and "thermal shock resistance" were evaluated by the following methods. Table 2 shows the results.

(Isostatic Strength)

Measurement of the isostatic strength was carried out on the basis of an isostatic breakdown strength test stipulated in JASO Standard M505-87 of a car standard issued by the society of Automotive Engineers of Japan. In the isostatic breakdown strength test, the honeycomb structure was placed in a rubber tubular container, the container was closed with a lid of an aluminum plate, and isotropic pressurizing compression was performed in water. In other words, the isostatic breakdown strength test was a test to simulate compressive load weighting when a circumferential surface of the honeycomb structure was grasped in a can member. The isostatic strength measured by this isostatic breakdown strength test is indicated with a pressurizing pressure value (MPa) when the honeycomb structure breaks down. The evaluation of the isostatic strength was carried out in accordance with Evaluation Criteria 1 mentioned below.

(Evaluation Criteria 1)

Evaluation A: The isostatic strength is +1.5 MPa or more to the isostatic strength of Comparative Example 1.

Evaluation B: The isostatic strength is +1.0 MPa or more and less than +1.5 MPa to the isostatic strength of Comparative Example 1.

Evaluation C: The isostatic strength is +0.5 MPa or more and less than +1.0 MPa to the isostatic strength of Comparative Example 1.

Evaluation D: The isostatic strength is less than +0.5 MPa to the isostatic strength of Comparative Example 1.

(Dimensional Accuracy (Four-Point Average Diameter))

In the evaluation of the dimensional accuracy, an average diameter of four points of a round pillar-shaped honeycomb structure was measured, and the dimensional accuracy was evaluated on the basis of Evaluation Criteria 1 mentioned below. In the measurement of the four-point average diameter, initially, diameters of four points in total were measured with a pair of Vernier calipers at intervals of 45° from one point in the circumference of the honeycomb structure in the cross section of the honeycomb structure which was perpendicular to the cell extending direction. Next, an average value of the measured diameters of the four points was obtained, and the obtained average value was determined as an average diameter (mm) of the four points of the honeycomb structure. It is to be noted that in the following evaluation criteria, "an aimed diameter" means "a targeted diameter" in preparing a honeycomb structure of each example.

(Evaluation Criteria 1)

Evaluation A: The four-point average diameter is within ±0.5 mm to the aimed diameter.

Evaluation B: The four-point average diameter is within ±1.0 mm to the aimed diameter.

Evaluation C: The four-point average diameter is within ±1.5 mm to the aimed diameter.

Evaluation D: The four-point average diameter is in excess of ±2.0 mm to the aimed diameter.

(Pressure Loss)

The honeycomb structure was attached to an exhaust system of a car including a mounted diesel engine for a truck which had a displacement of 7.0 L. A vehicle test by a chassis dynamometer was carried out by using this car, and pressure loss during full load step-up was measured. Specifically, an engine speed was raised up to 2500 rpm every 500 rpm in five minutes/step, and the pressure loss in each step was measured. The pressure loss of the honeycomb structure of Comparative Example 1 was used as a standard value of the pressure loss evaluation. Pressure loss values of the respective examples and comparative examples were compared with the value of the pressure loss of the Comparative Example 1 having the standard value, and pressure loss evaluation was carried out in accordance with Evaluation Criteria 1 mentioned below. Additionally, in the evaluation, the pressure loss when the engine speed was 2500 rpm was used.

(Evaluation Criteria 1)

Evaluation A: The pressure loss is less than +5% to the pressure loss of Comparative Example 1.

Evaluation B: The pressure loss is less than +10% to the pressure loss of Comparative Example 1.

Evaluation C: The pressure loss is less than +15% to the pressure loss of Comparative Example 1.

Evaluation D: The pressure loss is +15% or more to the pressure loss of Comparative Example 1.

(Thermal Shock Resistance)

The evaluation of a thermal shock resistance by an electric furnace spalling test was carried out on the basis of a method stipulated in JASO Standard M505-87 of a car standard issued by the society of Automotive Engineers of Japan. Specifically, the honeycomb structure at room temperature was initially disposed in an electric furnace kept at a temperature higher as much as a predetermined temperature than room temperature. In this state, the honeycomb structure was held for 20 minutes, and then, the honeycomb structure was taken out onto a refractory brick. In this state, the honeycomb structure was left to stand naturally for 15 minutes or more, and cooled until the temperature reached room temperature, and it was checked whether or not damages such as cracks were generated in the honeycomb structure. This operation was repeated until damages such as the cracks were generated in the honeycomb structure. Furthermore, the temperature in the electric furnace was raised every 25° C. every time the above operation was repeated. The temperature in the electric furnace in the operation just before an operation in which it was confirmed that damages such as the cracks were generated in the honeycomb structure was defined as a safe temperature of the honeycomb structure. The evaluation of the thermal shock resistance was carried out in accordance with Evaluation Criteria 1 mentioned below.

(Evaluation Criteria 1)

Evaluation A: A safe temperature is 650° C. or more.

Evaluation B: The safe temperature is 550° C. or more and less than 650° C.

Evaluation C: The safe temperature is 450° C. or more and less than 550° C.

Evaluation D: The safe temperature is less than 450° C.

Examples 2 to 10

The procedure of Example 1 was repeated except that each constitution of a honeycomb structure was changed as shown in Table 1, to manufacture honeycomb structures of Examples 2 to 10. The procedure of Example 1 was repeated to carry out respective evaluations of the honeycomb structure of Examples 2 to 10. Table 2 shows the results.

Comparative Examples 1 to 9

The procedure of Example 1 was repeated except that each constitution of a honeycomb structure was changed as shown in Table 1, to manufacture honeycomb structures of Comparative Examples 1 to 9. Additionally, in the honeycomb structure of Comparative Example 1, a first circumferential wall of a honeycomb structure body was all removed by grinding, and a second circumferential wall was disposed in a circumference of the honeycomb structure body from which the first circumferential wall was all removed, to prepare the honeycomb structure. The procedure of Example 1 was repeated to carry out respective evaluations of the honeycomb structure of Comparative Examples 1 to 9. Table 2 shows the results.

Examples 11 to 20

The procedure of Example 1 was repeated except that each constitution of a honeycomb structure was changed as shown in Table 3, to manufacture honeycomb structures of Examples 11 to 20. Additionally, each of the honeycomb structures of Examples 11 to 20 had a round pillar shape in which a diameter of each end face was 266.7 mm and a length in a cell extending direction was 152.4 mm. The procedure of Example 1 was repeated to carry out respective evaluations of the honeycomb structures of Examples 11 to 20. However, in the respective evaluations, evaluation criteria were changed to Evaluation Criteria 2 mentioned below. Specifically, in evaluations of "isostatic strength" and "pressure loss", a honeycomb structure of a standard was changed to a honeycomb structure of Comparative Example 10 as shown in Evaluation Criteria 2. Furthermore, as to the evaluations of "dimensional accuracy" and "thermal shock resistance", values of the evaluation criteria were changed as shown in Evaluation Criteria 2 mentioned below. Table 4 shows the results.

Comparative Examples 10 to 18

The procedure of Example 11 was repeated except that each constitution of a honeycomb structure was changed as shown in Table 3, to manufacture honeycomb structures of Comparative Examples 10 to 18. Additionally, in the honeycomb structure of Comparative Example 10, a first circumferential wall of a honeycomb structure body was all removed by grinding, and a second circumferential wall was disposed in a circumference of the honeycomb structure body from which the first circumferential wall was all removed, to prepare the honeycomb structure. The procedure of Example 11 was repeated to carry out respective evaluations of the honeycomb structure of Comparative Examples 10 to 18. Table 4 shows the results.

TABLE 4

|  | Isostatic strength | Dimensional accuracy | Pressure loss | Thermal shock resistance |
|---|---|---|---|---|
| Comparative Example 10 | Standard | A | Standard | A |
| Example 11 | B | A | A | A |
| Example 12 | B | B | A | B |
| Example 13 | B | A | B | A |
| Example 14 | B | B | A | A |
| Example 15 | B | B | B | B |
| Comparative Example 11 | D | D | C | C |
| Comparative Example 12 | D | D | C | C |
| Example 16 | C | C | B | C |
| Example 17 | C | C | B | C |
| Comparative Example 13 | C | B | B | D |
| Comparative Example 14 | C | B | B | D |
| Example 18 | A | A | C | A |
| Example 19 | A | A | C | A |
| Example 20 | A | C | C | A |
| Comparative Example 15 | A | D | C | A |
| Comparative Example 16 | A | D | C | A |
| Comparative Example 17 | A | A | D | A |
| Comparative Example 18 | A | A | D | A |

(Isostatic Strength)
(Evaluation Criteria 2)
Evaluation A: An isostatic strength is +1.5 MPa or more to an isostatic strength of Comparative Example 10.

TABLE 3

|  | Porosity of partition walls [%] | Maximum thickness X1 of circumferential wall [mm] | Difference Y between maximum thickness X1 and minimum thickness X2 [mm] | Average thickness TA of partition walls [μm] | Difference A between average thickness TB and average thickness TA [μm] | Area ratio of circumferential portion B [%] | AB | Cell density [cells/cm²] |
|---|---|---|---|---|---|---|---|---|
| Comparative Example 10 | 35 | 1.0 | 0.1 | 114 | 0 | 0% | 0.0 | 62 |
| Example 11 | 35 | 2.0 | 0.8 | 114 | 13 | 20% | 2.5 | 62 |
| Example 12 | 35 | 2.5 | 1.2 | 114 | 9 | 20% | 1.8 | 62 |
| Example 13 | 35 | 2.0 | 0.8 | 114 | 25 | 20% | 5.0 | 62 |
| Example 14 | 35 | 2.5 | 1.2 | 114 | 13 | 10% | 1.3 | 62 |
| Example 15 | 35 | 2.0 | 0.8 | 114 | 13 | 30% | 3.9 | 62 |
| Comparative Example 11 | 35 | 3.0 | 1.5 | 114 | 6 | 7% | 0.4 | 62 |
| Comparative Example 12 | 35 | 3.0 | 1.5 | 114 | 3 | 14% | 0.4 | 62 |
| Example 16 | 35 | 3.0 | 1.5 | 114 | 6 | 8% | 0.5 | 62 |
| Example 17 | 35 | 3.0 | 1.5 | 114 | 8 | 6% | 0.5 | 62 |
| Comparative Example 13 | 35 | 3.1 | 1.5 | 114 | 8 | 6% | 0.5 | 62 |
| Comparative Example 14 | 35 | 3.0 | 1.6 | 114 | 8 | 6% | 0.5 | 62 |
| Example 18 | 35 | 1.7 | 0.6 | 114 | 26 | 35% | 9.0 | 62 |
| Example 19 | 35 | 1.7 | 0.6 | 114 | 28 | 32% | 9.0 | 62 |
| Example 20 | 35 | 1.2 | 0.2 | 114 | 26 | 35% | 9.0 | 62 |
| Comparative Example 15 | 35 | 1.1 | 0.2 | 114 | 26 | 35% | 9.0 | 62 |
| Comparative Example 16 | 35 | 1.2 | 0.1 | 114 | 26 | 35% | 9.0 | 62 |
| Comparative Example 17 | 35 | 1.7 | 0.6 | 114 | 26 | 36% | 9.2 | 62 |
| Comparative Example 18 | 35 | 1.7 | 0.6 | 114 | 28 | 33% | 9.2 | 62 |

Evaluation B: The isostatic strength is +1.0 MPa or more and less than +1.5 MPa to the isostatic strength of Comparative Example 10.

Evaluation C: The isostatic strength is +0.5 MPa or more and less than +1.0 MPa to the isostatic strength of Comparative Example 10.

Evaluation D: The isostatic strength is less than +0.5 MPa to the isostatic strength of Comparative Example 10.

(Dimensional Accuracy (Four-Point Average Diameter))
(Evaluation Criteria 2)

Evaluation A: A four-point average diameter is within ±0.5 mm to an aimed diameter.

Evaluation B: The four-point average diameter is within ±1.5 mm to the aimed diameter.

Evaluation C: The four-point average diameter is within ±2.0 mm to the aimed diameter.

Evaluation D: The four-point average diameter is in excess of ±2.5 mm to the aimed diameter.

(Pressure Loss)
(Evaluation Criteria 2)

Evaluation A: Pressure loss is less than +5% to pressure loss of Comparative Example 10.

Evaluation B: The pressure loss is less than +10% to pressure loss of Comparative Example 10.

Evaluation C: The pressure loss is less than +15% to pressure loss of Comparative Example 10.

Evaluation D: The pressure loss is +15% or more to the pressure loss of Comparative Example 10.

evaluations of the honeycomb structures of Examples 21 to 24. However, in evaluation criteria of the respective evaluations, a honeycomb structure of a standard in "Evaluation Criteria 1" mentioned above was changed as follows, but otherwise the evaluation was carried out on the basis of "Evaluation Criteria 1" mentioned above. Table 6 shows the results.

As to Example 21, the honeycomb structure of the standard was Comparative Example 19.

As to Example 22, the honeycomb structure of the standard was Comparative Example 20.

As to Example 23, the honeycomb structure of the standard was Comparative Example 21.

As to Example 24, the honeycomb structure of the standard was Comparative Example 22.

Comparative Examples 19 to 22

The procedure of Example 21 was repeated except that each constitution of a honeycomb structure was changed as shown in Table 5, to manufacture honeycomb structures of Comparative Examples 19 to 22. Additionally, in each of the honeycomb structures of Comparative Examples 19 to 22, a first circumferential wall of a honeycomb structure body was all removed by grinding, and a second circumferential wall was disposed in a circumference of the honeycomb structure body from which the first circumferential wall was all removed, to prepare the honeycomb structure. The procedure of Example 21 was repeated to carry out respective evaluations of the honeycomb structures of Comparative Examples 19 to 22. Table 6 shows the results.

TABLE 5

| | Porosity of partition walls [%] | Maximum thickness X1 of circumferential wall [mm] | Difference Y between maximum thickness X1 and minimum thickness X2 [mm] | Average thickness TA of partition walls [μm] | Difference A between average thickness TB and average thickness TA [μm] | Area ratio of circumferential portion B [%] | AB | Cell density [cells/cm²] |
|---|---|---|---|---|---|---|---|---|
| Comparative Example 19 | 35 | 1.0 | 0.1 | 260 | 0 | 0% | 0.0 | 28 |
| Example 21 | 35 | 2.0 | 0.8 | 260 | 13 | 20% | 2.5 | 28 |
| Comparative Example 20 | 35 | 1.0 | 0.1 | 50 | 0 | 0% | 0.0 | 140 |
| Example 22 | 35 | 2.0 | 0.8 | 50 | 13 | 20% | 2.5 | 140 |
| Comparative Example 21 | 25 | 1.0 | 0.1 | 114 | 0 | 0% | 0.0 | 62 |
| Example 23 | 25 | 2.0 | 0.8 | 114 | 13 | 20% | 2.5 | 62 |
| Comparative Example 22 | 60 | 1.0 | 0.1 | 114 | 0 | 0% | 0.0 | 62 |
| Example 24 | 60 | 2.0 | 0.8 | 114 | 13 | 20% | 2.5 | 62 |

(Thermal Shock Resistance)
(Evaluation Criteria 2)

Evaluation A: A safe temperature is 600° C. or more.

Evaluation B: The safe temperature is 500° C. or more and less than 600° C.

Evaluation C: The safe temperature is 400° C. or more and less than 500° C.

Evaluation D: The safe temperature is less than 400° C.

Examples 21 to 24

The procedure of Example 1 was repeated except that each constitution of a honeycomb structure was changed as shown in Table 5, to manufacture honeycomb structures of Examples 21 to 24. Additionally, each of the honeycomb structures of Examples 21 to 24 had a round pillar shape in which a diameter of each end face was 177.8 mm and a length in a cell extending direction was 152.4 mm. The procedure of Example 1 was repeated to carry out respective

TABLE 6

| | Isostatic strength | Dimensional accuracy | Pressure loss | Thermal shock resistance |
|---|---|---|---|---|
| Comparative Example 19 | Standard | A | Standard | A |
| Example 21 | B | A | A | A |
| Comparative Example 20 | Standard | A | Standard | A |
| Example 22 | B | A | A | A |
| Comparative Example 21 | Standard | A | Standard | A |
| Example 23 | B | A | A | A |
| Comparative Example 22 | Standard | A | Standard | A |
| Example 24 | B | A | A | A |

(Result)

According to the honeycomb structures of Examples 1 to 24, the results of evaluation A to evaluation C were obtained in all the evaluations. As to the evaluation A to the evaluation C, it can be considered that the honeycomb structures exhibit excellent characteristics.

On the other hand, according to the honeycomb structures of Comparative Examples 2, 3, 11 and 12 in which a value of "AB" was 0.4, the result of evaluation D indicating a failure was obtained in the evaluations of "isostatic strength" and "dimensional accuracy". Furthermore, according to the honeycomb structures of Comparative Examples 8, 9, 17 and 18 in which a value of "AB" was 9.2, the result of evaluation D indicating a failure was obtained in the an evaluation of "pressure loss".

Furthermore, according to the honeycomb structures of Comparative Examples 4 and 13 in which a value of "a maximum thickness X1 (mm) of a circumferential wall" was 3.1 mm, the result of evaluation D indicating a failure was obtained in an evaluation of "thermal shock resistance". In addition, according to the honeycomb structures of Comparative Examples 6 and 15 in which the value of "the maximum thickness X1 (mm) of the circumferential wall" was 1.1 mm, the result of evaluation D indicating a failure was obtained in the evaluation of "dimensional accuracy".

Additionally, according to the honeycomb structures of Comparative Examples 5 and 14 in which a value of "a difference Y (mm) between the maximum thickness X1 and a minimum thickness X2" was 1.6 mm, the result of evaluation D indicating a failure was obtained in the evaluation of "thermal shock resistance". Additionally, according to the honeycomb structures of Comparative Examples 7 and 16 in which the value of "the difference Y (mm) between the maximum thickness X1 and the minimum thickness X2" was 0.1 mm, the result of evaluation D indicating a failure was obtained in the evaluation of "dimensional accuracy".

In addition, also as to Example 21 and Comparative Example 19 in which a cell density of a honeycomb structure is changed, it is seen that in the honeycomb structure of the Example 21, improvements of the isostatic strength and pressure loss are achieved as compared with the honeycomb structure of Comparative Example 19. Similarly, also as to Example 22 and Comparative Example 20, it is seen that in the honeycomb structure of the Example 22, the improvements of the isostatic strength and pressure loss are achieved as compared with the honeycomb structure of Comparative Example 20.

Furthermore, also as to Example 23 and Comparative Example 21 in which a thickness of partition walls of a honeycomb structure is changed, it is seen that in the honeycomb structure of Example 23, the improvements of the isostatic strength and pressure loss are achieved as compared with the honeycomb structure of Comparative Example 21. Similarly, also as to Example 24 and Comparative Example 22, it is seen that in the honeycomb structure of Example 24, the improvements of the isostatic strength and pressure loss are achieved as compared with the honeycomb structure of Comparative Example 22.

A honeycomb structure of the present invention is utilizable as a catalyst carrier onto which there is loaded a catalyst to purify an exhaust gas emitted from a gasoline engine, a diesel engine or the like, or a filter to purify the exhaust gas.

DESCRIPTION OF REFERENCE NUMERALS 1, 1a and 1b: partition wall, 2, 2a and 2b: cell, 3: first circumferential wall, 4: second circumferential wall, 5: honeycomb structure body, 11: inflow end face, 12: outflow end face, 15: central portion, 16: circumferential portion, and 100: honeycomb structure.

What is claimed is:

1. A honeycomb structure comprising:
a honeycomb structure body having porous partition walls which define a plurality of cells extending from an inflow end face to an outflow end face to form through channels for a fluid, and a first circumferential wall which is disposed in at least a part of a circumference of the partition walls, and
a second circumferential wall disposed to surround an outer side of the honeycomb structure body,
wherein the honeycomb structure body includes a central portion constituted by partition walls arranged in a central region of a cross section perpendicular to an extending direction of the cells, and a circumferential portion constituted so that a thickness of the partition walls of the circumferential portion is larger than a thickness of the partition walls of the central portion,
the honeycomb structure body does not have an interface between the partition wall of the outermost circumference in the circumferential portion and the first circumferential wall,
a maximum thickness X1 of a total of the first circumferential wall and the second circumferential wall is from 1.2 to 3.0 mm,
a difference Y between the maximum thickness X1 of the total of the first circumferential wall and the second circumferential wall and a minimum thickness X2 of the total of the first circumferential wall and the second circumferential wall is from 0.2 to 1.5 mm, and
the honeycomb structure body satisfies a relation of Equation (1) mentioned below:

$$0.5 \leq AB \leq 9.0, \qquad \text{Equation (1):}$$

in which A indicates a value of a difference TB−TA (μm) between an average thickness TB (μm) of the partition walls in the circumferential portion and an average thickness TA (μm) of the partition walls in the central portion, and B indicates SB/SA×100(%) that is a percentage of a ratio of an area SB (cm$^2$) of the circumferential portion in the cross section to an area SA (cm$^2$) of the honeycomb structure in the cross section perpendicular to the extending direction of the cells.

2. The honeycomb structure according to claim 1, wherein a diameter of the honeycomb structure in the cross section perpendicular to the extending direction of the cells is from 177.8 to 266.7 mm.

3. The honeycomb structure according to claim 1, wherein in the cross section perpendicular to the extending direction of the cells, the minimum thickness X2 of the total of the first circumferential wall and the second circumferential wall is less than 1.4 mm.

4. The honeycomb structure according to claim 2, wherein in the cross section perpendicular to the extending direction of the cells, the minimum thickness X2 of the total of the first circumferential wall and the second circumferential wall is less than 1.4 mm.

5. The honeycomb structure according to claim 1, wherein in the cross section perpendicular to the extending direction of the cells, the difference A between the average thickness TB (μm) of the partition walls in the circumferential portion and the average thickness TA (μm) of the partition walls in the central portion is from 9 to 25 μm.

6. The honeycomb structure according to claim 4, wherein in the cross section perpendicular to the extending direction of the cells, the difference A between the average thickness TB (μm) of the partition walls in the circumferential portion and the average thickness TA (μm) of the partition walls in the central portion is from 9 to 25 μm.

7. The honeycomb structure according to claim 1, wherein the percentage B of the ratio of the area SB ($cm^2$) of the circumferential portion in the cross section to the area SA ($cm^2$) of the honeycomb structure in the cross section perpendicular to the extending direction of the cells is from 10 to 30%.

8. The honeycomb structure according to claim 6, wherein the percentage B of the ratio of the area SB ($cm^2$) of the circumferential portion in the cross section to the area SA ($cm^2$) of the honeycomb structure in the cross section perpendicular to the extending direction of the cells is from 10 to 30%.

9. The honeycomb structure according to claim 1, further comprising:
plugging portions disposed in open ends of the cells of at least parts of the plurality of cells on the side of the inflow end face or the outflow end face, to plug the open ends of the cells.

10. The honeycomb structure according to claim 8, further comprising:
plugging portions disposed in open ends of the cells of at least parts of the plurality of cells on the side of the inflow end face or the outflow end face, to plug the open ends of the cells.

* * * * *